United States Patent
Cordina et al.

(10) Patent No.: US 6,760,153 B2
(45) Date of Patent: Jul. 6, 2004

(54) OPTICAL COMPONENT WITH SIGNAL AMPLIFICATION

(75) Inventors: Kevin J Cordina, Bishops Stortford (GB); Gordon D Henshall, Essex (GB); Stephen Rolt, Ware (GB)

(73) Assignee: Nortel Networks Limited, St. Laurent (CA)

( * ) Notice: Subject to any disclaimer, the term of this patent is extended or adjusted under 35 U.S.C. 154(b) by 421 days.

(21) Appl. No.: 09/994,116

(22) Filed: Nov. 26, 2001

(65) Prior Publication Data

US 2003/0099429 A1 May 29, 2003

(51) Int. Cl.[7] ............................................... H01S 3/00
(52) U.S. Cl. .......................... 359/342; 385/18; 385/16; 385/33
(58) Field of Search ........................ 359/342; 385/18, 385/16, 17, 33

(56) References Cited

U.S. PATENT DOCUMENTS

| | | | | |
|---|---|---|---|---|
| 5,490,101 A | * | 2/1996 | Lee | 708/625 |
| 5,581,398 A | * | 12/1996 | van Veggel et al. | 359/342 |
| 5,657,156 A | * | 8/1997 | van Veggel et al. | 359/342 |
| 5,717,517 A | * | 2/1998 | Alfano et al. | 359/342 |
| 6,392,791 B1 | * | 5/2002 | Fork et al. | 359/347 |

FOREIGN PATENT DOCUMENTS

EP          989460 A1  *  3/2000  ............ G03F/7/004

* cited by examiner

Primary Examiner—Frank G. Font
Assistant Examiner—Kevin C Kianni
(74) Attorney, Agent, or Firm—Barnes & Thornburg

(57) ABSTRACT

An optical component comprising a plurality of optical input ports and a plurality of optical output ports. A polymer amplifying medium is provided within the component which is pumped by a pump source for exciting the polymer amplifying medium. Signals passing through the optical component are routed through the polymer amplifying medium. This, provides amplification using a polymer amplifying medium which is integrated into the structure of the component. This amplification can then compensate for the loss resulting from the other functions of the component.

19 Claims, 3 Drawing Sheets

OPTICAL COMPONENT WITH SIGNAL AMPLIFICATION

FIELD OF THE INVENTION

This invention relates generally to optical components, and more specifically to optical components in which amplification is provided, for example to compensate for loss resulting from the operation of the component. Particularly, but not exclusively, the invention relates to optical micromirror switching arrays.

BACKGROUND OF THE INVENTION

Optical communication systems require high speed data, implemented as optical signals, to be switched between ports of a switching device to allow a signal routing function. Typically, the optical signals are carried by optical fibers, which connect to the optical switching device. There are currently a number of methods for achieving the required switching operation.

One solution comprises an electromechanical arrangement, where a signal in an optical fiber A is routed to fiber B by mechanically aligning fiber A with fiber B. This arrangement is bulky and mostly suited only to 1×N switch configurations.

An alternative solution is to use a hybrid optical switch in which the optical signals are first converted to electrical signals which are switched in a conventional manner. The resulting outputs of the switch are then converted back to optical signals. This adds complexity and expense to the switching operation.

Optical switches are also known in which a control signal is used to vary the path of an optical signal. For example, waveguide-based switches rely on the change of refractive indices in the waveguides under the influence of an external electric field, current or other signal.

Optical switches using an array of mirrors which can be mechanically tilted are also known. Small micromirrors (for example less than 1 mm) are arranged in a line or array, and the incident light signal is deflected by controlling the tilt angle of each micromirror. Mirror type optical switches include digital micromirror devices which tilt each micromirror by electrostatic force, piezoelectric drive micromirror devices which tilt each micromirror by a fine piezoelectric element and electromagnetic devices which rely upon electromagnetic and electrostatic forces.

In a typical micromirror device, a plurality of micromirrors are arranged in an array of N×M mirrors. Each micromirror can be controlled and is capable of switching between a first reflection state and a second non-reflection state. The optical signal is routed between an input and a selected output by controlling the reflection state of each mirror.

Switching and routing components are generally lossy, and when these components are used within an optical node of an optical communications system, pre- and/or post-amplifiers are generally provided to offset the loss of the switch. This adds components to the system and therefore adds cost and complexity and there are reliability issues.

It is therefore desirable to integrate amplification into components when possible. one particular application of the invention is to these micromirror optical switch devices, although the invention is also applicable to other devices.

SUMMARY OF THE INVENTION

According to a first aspect of the invention, there is provided an optical component comprising a plurality of optical input ports and a plurality of optical output ports, wherein the component comprises:
  a substrate arrangement comprising a polymer amplifying medium;
  a pump source providing a pump signal for exciting the polymer amplifying medium,
  wherein signals passing through the optical component are routed through the polymer amplifying medium.

The component of the invention provides amplification using a polymer amplifying medium which is integrated into the structure of the component. This amplification can then compensate for the loss resulting from the other functions of the component.

The substrate arrangement may be formed from the polymer or it may be coated with it.

For example, the substrate arrangement may comprise a lens through which all optical input signals are routed. Lenses are often required in optical components and coating a lens provides a cost effective way of implementing the invention. Alternatively, the lens may be formed from the polymer amplifying medium. The substrate arrangement may comprise a plurality of lenses, one lens being associated with each input port.

The component may be an optical switching array, and the substrate arrangement may then comprise a plurality of reflectors, for example micro-electromechanical mirrors with each mirror provided with a layer of the polymer amplifying radium. Different mirrors may be provided with different thickness layers so that different amplification can be provided for different paths through the switch.

The component may comprise an optical switching array, comprising a first array of micro-electromechanical switches and a second array of micro-electromechanical switches, and wherein the mirrors in each array are provided with a layer of the polymer amplifying medium.

Alternatively, the component may comprise an optical switching array comprising a first array of micro-electromechanical switches which directs light from the input ports to a mirror surface and a second array of micro-electromechanical switches which directs light from the mirror surface to the output ports, wherein a layer of polymer amplifying medium is provided over the reflective surface which together define the substrate arrangement.

In this configuration of optical switch, a single internal reflector can be provided with the coating.

The invention also provides a method of routing an optical signal using an optical routing component, comprising:
  providing the signal from a first input of the component to a reflector;
  amplifying the signal by means of a layer of a polymer amplifying medium provided over the reflector;
  providing the signal from the reflector to a selected output of the component.

The reflector may comprise a mirror of a micro-electromechanical mirror array.

An alternative method comprises;
  providing the signal from a first input to a lens;
  amplifying the signal by means of a polymer amplifying medium forming or provided over the lens;
  providing the signal from the lens to a reflector;
  providing the signal from the reflector to a selected output of the component.

BRIEF DESCRIPTION OF THE DRAWINGS

Examples of the invention will now be described in detail with reference to the accompanying drawings, in which.

DETAILED DESCRIPTION

Figure 1:
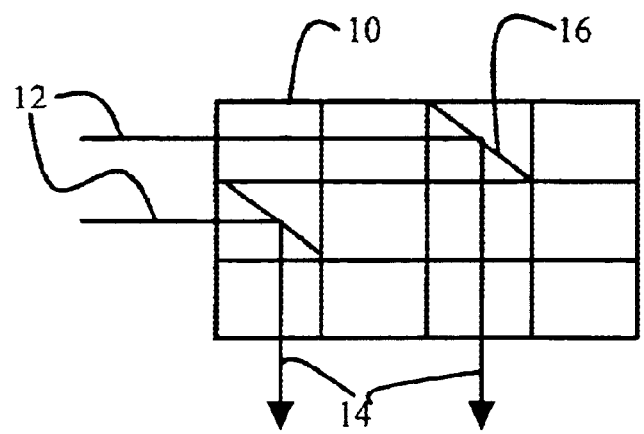
FIG. 1 shows a MEMS micromirror switching array and is used to explain the operation of the array.

The MEMS micromirror switching array 10 shown in FIG. 1 comprises an array of small (typically less than 1 mm) mirrors arranged in orthogonal rows and columns. The inputs 12, 18 to the switching array are provided at one edge of the array, and the signal outputs 14, 20 from the array are collected from an orthogonal edge. Of course, the signals do not necessarily need to be reflected by 90 degrees, and mirror arrangements may provide different angles between the input and output optical paths. Each mirror is moveable between first and second positions. In one of the positions, the mirror lies outside the path of an incident optical signal, whereas in the other of the positions, an incident optical signal is reflected by the mirror to an associated output. The micromirror switching array 10 is fabricated using standard lithographical and semiconductor processing techniques which will be known to those skilled in the art.

In accordance with the invention, an optical amplifying polymer is used within the optical switch structure in order to provide signal amplification within the optical switch. Polymer materials can be designed to provide substantial quantities of optical gain. They have a very high absorption and very high gain per unit length. This means that high gains can be achieved in a very short space, for example a few hundred nanometres for a useful amount of gain.

These polymers can easily be deposited on surfaces. For example, polymers can be deposited on the surface of optical mirrors or any other component which can act as a substrate. A pump can then be used to pump the material, so that any light passing through the polymer will experience gain.

Broadband polymer amplifiers are a topic of active research at St Andrews university. Whilst light emission from polymers is well known, active research is now yielding practical, useful materials for amplifiers.

There are a number of types of light emitting polymer, falling into two main broad categories, which can be thought of as doped polymers and direct-emitting polymers. Doped polymers are analogous to the doped glasses used in amplifiers today, and can offer some advantages or interesting properties over doped glasses.

Of more interest are polymers which emit light due to their inherent material structure. This provides the material with a large optical bandwidth and a very high gain cross section. This is the key requirement for this invention, as useful amounts of gain must be provided for the short optical paths through the polymer layer.

Of particular interest are conjugated Fluorene-based polymers, which exhibit high Photoluminescence efficiency, low stimulated emission threshold, high stability and good material processing properties. The location of the gain bandwidth can be set by the chemical composition of the polymer.

By way of example, results have been shown using poly (9,9-dioctylfluorene) (PFO). These films have been shown to exhibit gains of a small number of dB's in the visible spectrum, in thicknesses of approximately 1 $\mu$m. Other polymers may be preferred in the 1550 nm wavelength range typically of interest for optical communications systems, for example other examples of poly(dialkylfluorene).

The very high gain seen in these polymers is due to the fact that light emission occurs from electrons with the molecular structure of the polymer, not a dopant. Thus, the density of optically active sites is very, very high.

The polymers in question can be deposited using spin-coating and from liquid solution via precipitation. Other well known deposition methods can also be used.

Figure 2:
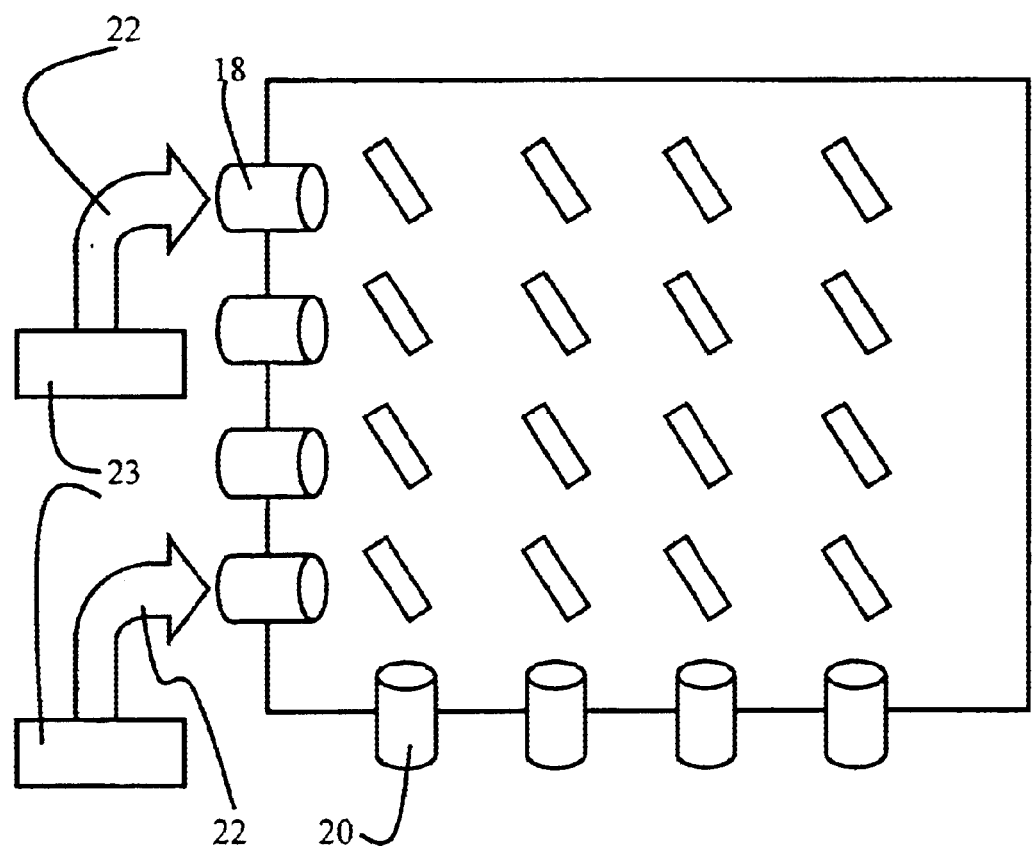
FIG. 2 shows a first switching array in accordance with the invention.

FIG. 2 shows one example of an optical switch in accordance with the invention. The switch shown in FIG. 2 is a 2D MEM structure, similar to that shown in FIG. 1. The switch has a number of input ports 18 and a number of output ports 20, and individual lenses are provided at each port. In this example of the invention, all of the input lenses or else all of the output lenses are coated with the polymer amplifying layer. Thus, the individual lenses provide a substrate arrangement for receiving the polymer amplifying medium. The lenses at the inputs or outputs are conventionally produced in arrays to allow precision alignment with the optical components. This enables the array of lenses to be coated in a single operation.

In order to provide the required excitation for amplification, pump light represented as 22 from a pump source 23 is tapped into the signal carrying fiber at the inputs or outputs of the switch for propagation towards the lenses.

Figure 3:
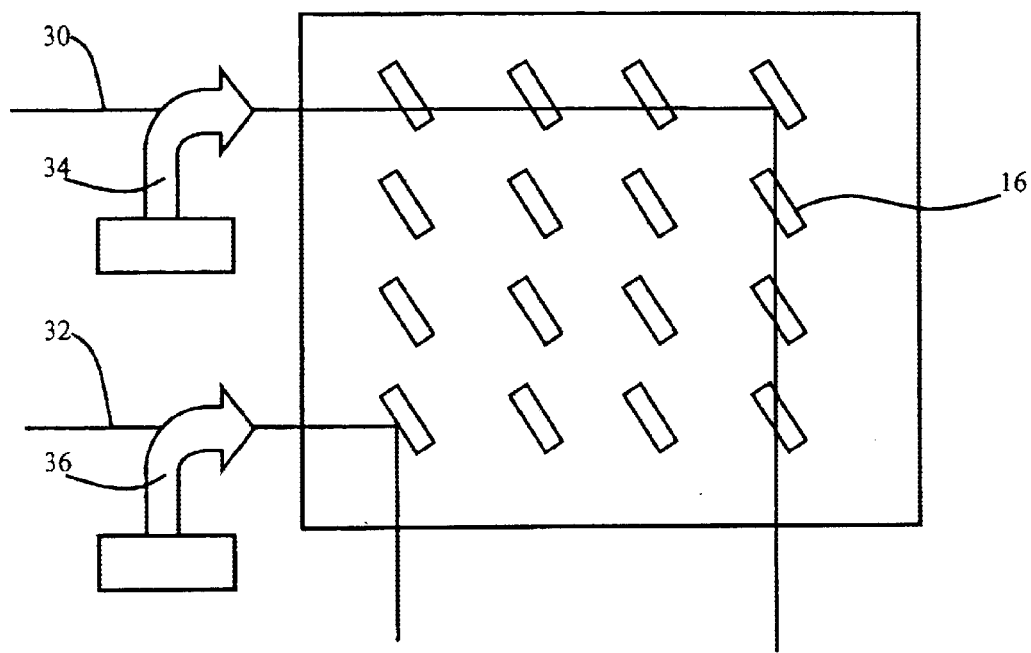
FIG. 3 shows a second switching array in accordance with the invention.

In the example of FIG. 3, each mirror 16 is coated with the amplifying medium. Thus, the array of mirrors provide the substrate arrangement for the polymer coating layer.

In many cases, the routing operation required of the switch does not change rapidly, but only changes in response to network alterations or faults. The configuration of the optical switch will therefore be known in advance, and this makes it possible to tune the amplification applied to each signal as a function of the loss experienced by that signal through the switch. In FIG. 3, first and second input signals 30, 32 are shown. The switching operation performed by the switch results in signal 30 experiencing significantly greater loss through the switch than signal 32. In order to compensate for this, higher power pump light 34 may be coupled to the input which receives signal 30, than the power of the pup light 36 coupled with the signal 32.

An alternative is to provide different polymer thickness across different areas of the switching array, as the loss experienced by a signal is a direct function of the position of the mirror within the switch array.

Figure 4:
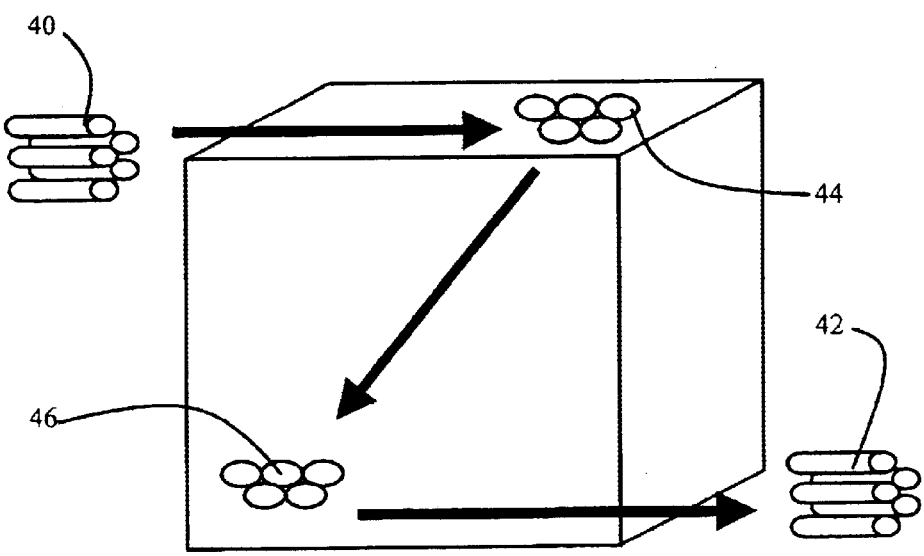
FIG. 4 shows a third switching array in accordance with the invention.

FIG. 4 shows schematically a 3D mirror array. This is another known configuration of switching device and has a two-dimensional array of input fibers 40 and a two-dimensional array of output fibers 42. The signals in the optical switch undergo two reflections, at first and second two-dimensional mirror arrays 44, 46. In the example of FIG. 4, these two arrays 44, 46 are coated with the amplifying layer, and the required pump light is again coupled with the signals at the input to the optical switch. An alternative is to broadcast pump light to the coated mirrors inside the component.

Figure 5:
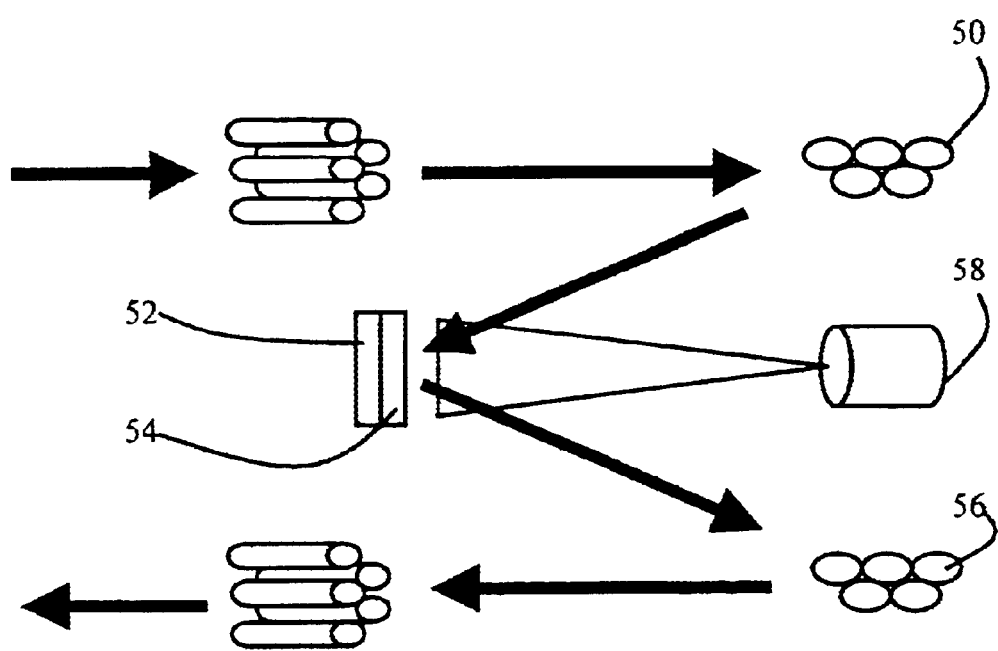
FIG. 5 shows a fourth switching array in accordance with the invention.

FIG. 5 shows a second version of 3D switching array in which a first MEM switch array 50 directs light from the input ports to a single mirror 52. This single mirror 52 is coated with the amplifying polymer layer 54 and reflects the signals to a second MEM switching array 56. This second switching array 56 redirects the signals to the output ports.

A single pump source 58 is used for illuminating the coated mirror 52 to provide the desired amplification.

The invention, when used with an optical switch, enables the loss to be compensated, but may also enable larger switch matrices to be produced.

There are various ways to pump the layer, and some of these have been described above. Pump light can either be coupled into the signal or else a free space pumping scheme can be employed. Polymer amplifying mediums can also be electrically pumped, which may be of benefit in some applications.

In the examples of 2D mirror arrays above, the pump light is coupled with the signals before entering the mirror array. However, a broadcast type pump light illumination scheme may also be employed in 2D mirror arrangements.

Also, in some examples above, amplification is provided by a coating over a lens or lenses within the optical component. As mentioned above, the lens or lenses can instead be formed from the material itself. This is likely to provide a thicker quantity of the material and therefore higher gain, and also avoids the need for a coating process.

We claim:

1. An optical component comprising a plurality of optical input ports and a plurality of optical output ports, wherein the component comprises:
   a substrate arrangement comprising a polymer amplifying medium;
   a pump source providing a pump signal for exciting the polymer amplifying medium,
   wherein signals passing through the optical component are routed through the polymer amplifying medium.

2. A component as claimed in claim 1, wherein the substrate arrangement comprises a substrate over which a layer of the polymer amplifying medium is provided.

3. A component as claimed in claim 1, wherein the substrate arrangement comprises a substrate formed from the polymer amplifying medium.

4. A component as claimed in claim 1, wherein the substrate arrangement comprises a lens through which all optical input signals are routed.

5. A component as claimed in claim 4, wherein the lens is formed from the polymer amplifying medium.

6. A component as claimed in claim 4, wherein the lens is coated with a layer of the polymer amplifying medium.

7. A component as claimed in claim 1, wherein the substrate arrangement comprises a plurality of lenses, one lens being associated with each input port.

8. A component as claimed in claim 7, wherein each lens is formed from the polymer amplifying medium.

9. A component as claimed in claim 8, wherein the pump source is arranged to provide pump light to the mirror surface.

10. A component as claimed in claim 7, wherein each lens is coated with a layer of the polymer amplifying medium.

11. A component as claimed in claim 1 comprising an optical switching array, wherein the substrate arrangement comprises a plurality of reflectors.

12. A component as claimed in claim 11 comprising a micro-electromechanical mirror array, and wherein each mirror is provided with the layer to polymer amplifying medium.

13. A component as claimed in claim 12, wherein different mirrors are provided with different thickness layers.

14. A component as claimed in claim 1 comprising an optical switching array, comprising a first array of micro-electromechanical switches and a second array of micro-electromechanical switches, and wherein the mirrors in each array are provided with a layer of the polymer amplifying medium.

15. A component as claimed in claim 1 comprising an optical switching array, comprising a first array of micro-electromechanical switches which directs light from the input ports to a mirror surface and a second array of micro-electromechanical switches which directs light from the mirror surface to the output ports, wherein a layer of the polymer amplifying medium is provided over the reflective surface.

16. A method of routing an optical signal using an optical routing component, comprising:
   providing the signal from a first input of the component to a reflector;
   amplifying the signal by means of a layer of a polymer amplifying medium provided over the reflector;
   providing the signal from the reflector to a selected output of the component.

17. A method as claimed in claim 16, wherein the reflector comprises a mirror of a micro-electromechanical mirror array.

18. A method as claimed in claim 16, wherein the signal is provided from the first input to a reflector via a mirror of a first micro-electromechanical mirror array, and the signal is provided from the reflector to the selected output via a mirror of a second micro-electromechanical mirror array.

19. A method of routing an optical signal using an optical routing component, comprising:
   providing the signal from a first input to a lens;
   amplifying the signal by means of a polymer amplifying medium forming or provided over the lens;
   providing the signal from the lens to a reflector;
   providing the signal from the reflector to a selected output of the component.

* * * * *